Dec. 13, 1938. F. A. KELLAR 2,140,109
BOOSTER DRIVE FOR TRUCK TRAILERS
Filed March 22, 1937 2 Sheets-Sheet 2
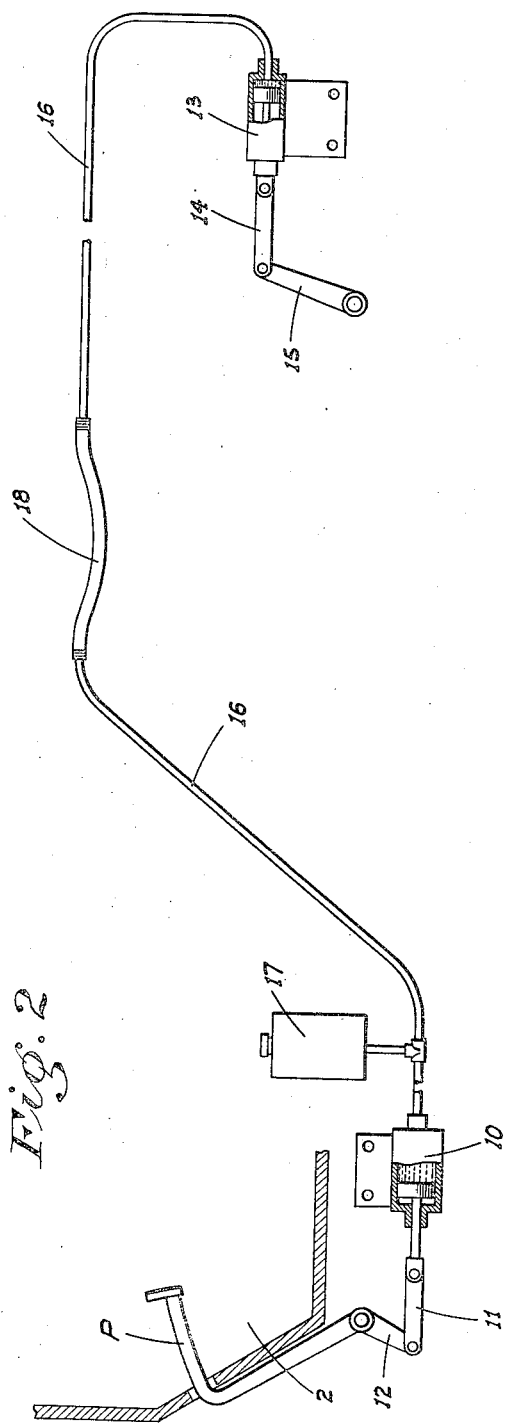
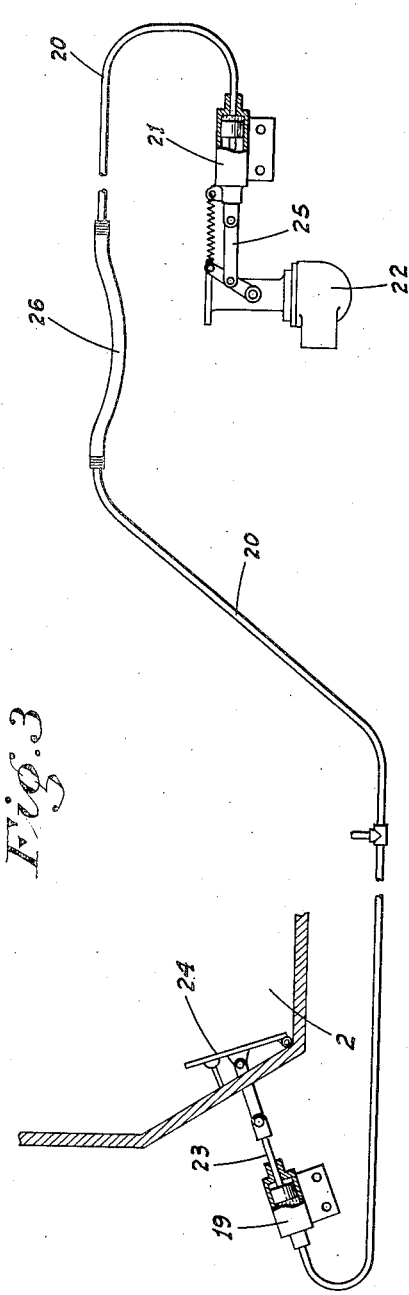
INVENTOR
F. A. Kellar
BY
ATTORNEY Patented Dec. 13, 1938

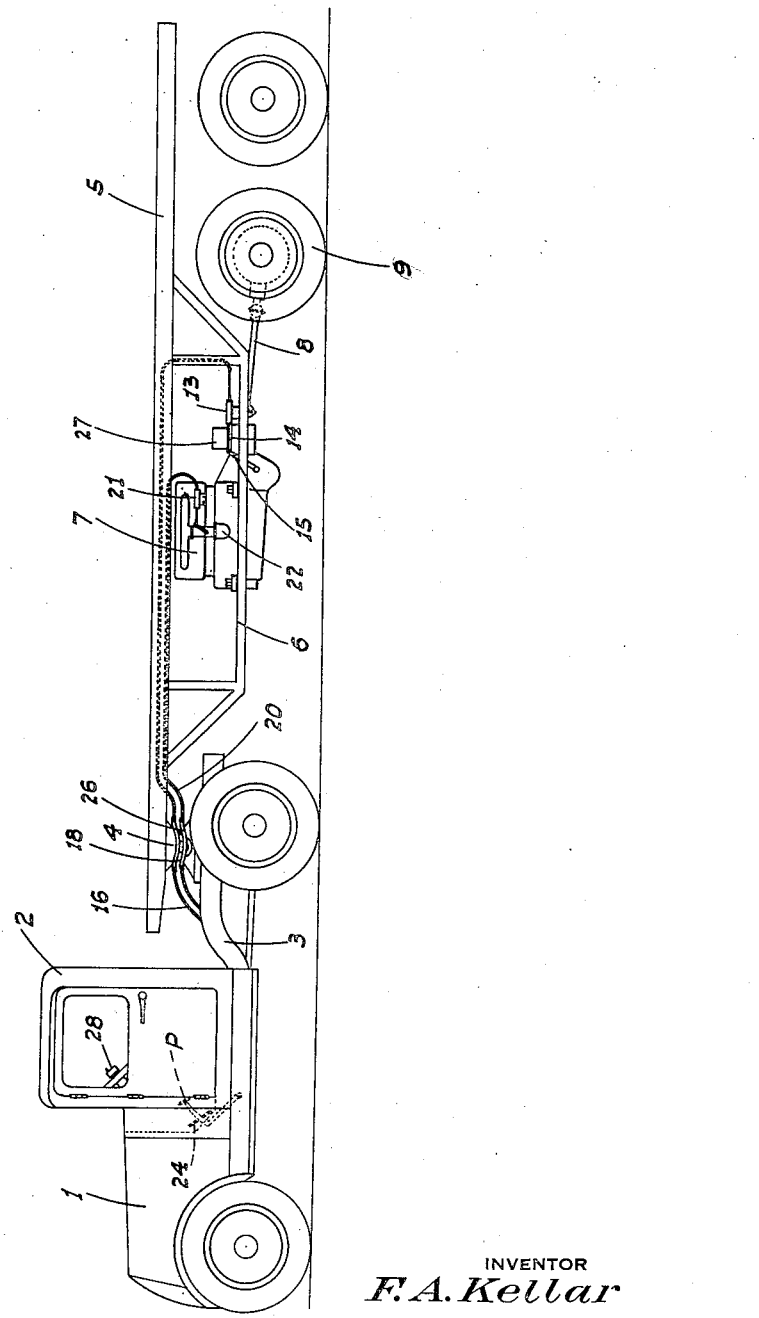

2,140,109

UNITED STATES PATENT OFFICE 2,140,109

BOOSTER DRIVE FOR TRUCK TRAILERS

Fred A. Kellar, Stockton, Calif.

Application March 22, 1937, Serial No. 132,454

1 Claim. (Cl. 180—14)

This invention relates generally to a booster drive arranged for use in connection with truck trailers, and particularly in connection with truck and semi-trailer units.

With the increasing use of modern high speed trucks and trailers (of either type) there is a tendency to construct the units of such size that there is no great amount of reserve power. Thus, when hills, muddy roads, sand, etc., are encountered, there is a tendency to stall and it is often necessary to operate the truck in low gear for many miles.

To overcome this difficulty it is my principal object to provide a truck and trailer unit in which the trailer is equipped with a booster engine arranged for selective driving connection with the trailer wheels; the engine mounted on the trailer being controlled from the truck cab by flexible remote control means which are operative regardless of the angular position of the trailer relative to the truck.

A further object of my invention is to provide remote control means, for the carburetor and clutch of the trailer engine, which are actuated by suitable connection with the usual clutch and carburetor control pedals in the truck cab, so that the two engines are synchronized in their operation.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Figure 1 is a side outline of a truck and semi-trailer unit illustrating diagrammatically my booster drive engine and remote controls therefor.

Figure 2 is a fragmentary and diagrammatic view of the remote control for the booster engine clutch.

Figure 3 is a similar view of the remote control for the booster engine carburetor.

Referring now more particularly to the characters of reference on the drawings, the numeral 1 indicates a truck including a cab 2 and exposed rear frame portion 3. A swivel connection 4 secures the forward portion of the frame 5 of a semi-trailer to the exposed portion 3 of the truck frame. The relatively long frame 5 of the semi-trailer is strengthened by means of a truss or sub-frame 6.

A power plant unit 7 of standard design and including as usual an engine, clutch and transmission is mounted on the semi-trailer and preferably, as shown, on the truss or sub-frame in order to make the center of gravity of the semi-trailer as low as possible. This power plant unit is coupled, by means of a drive shaft 8 with a rear axle having a differential and thus is arranged in driving connection with one pair of rear wheels 9 of the semi-trailer.

One form of remote control system for the clutch of the booster power plant unit is shown herein and comprises a cylinder and drive piston unit 10 mounted on the truck beneath the floor of the cab and with the piston rod connected by link 11 with the clutch pedal lever 12; the drive piston being in retracted position when the clutch pedal P is not depressed. Another cylinder and piston unit 13 is mounted adjacent the power plant unit on the trailer; the piston therein being the driven one and so arranged. A link 14 connects the piston rod of unit 13 to clutch control lever 15 of the power plant unit. A conduit 16 connects the cylinders 10 and 13 and affords communication therebetween for a hydraulic fluid supplied to the system from a reservoir 17 suitably check valved in the manner employed on hydraulic brake systems. A flexible section 18 is interposed in conduit 16; said section being disposed at a point immediately adjacent the swivel connection 4 between the truck and trailer frames.

The remote control system for the carburetor of the power plant unit on the trailer is constructed in substantially the same manner as above described relative to the clutch control system. A cylinder and drive piston unit 19 mounted on the truck is connected by a conduit 20 to another cylinder and driven piston unit 21 mounted adjacent the carburetor 22 of the trailer power plant unit. The piston rod of unit 19 is linked, as at 23, to the truck carburetor throttle pedal 24 while the piston rod of unit 21 is linked, as at 25, to the throttle arm of carburetor 22 of the trailer power plant unit. The pistons of units 19 and 21 are normally retracted when the system is inoperative just as in the clutch control system above described. The conduit 20 likewise has a flexible portion 26 interposed therein adjacent the swivel connection 4.

Remote control of the gear shifting of the transmission of the booster power plant unit is accomplished by means of an electric shifting mechanism 27 of the type now purchaseable on the market; the control box in the truck cab being shown diagrammatically at 28, and being operable independently of the truck gear shift mechanism.

Operation

When the truck and trailer are traveling empty or on smooth, level roads, the booster power plant unit on the trailer is inoperative and the transmission thereof in neutral.

However, when poor roads or grades are encountered, the booster power plant is placed in operation in the following manner:

The truck clutch pedal P is depressed causing the drive piston in unit 10 to be advanced forcing fluid through conduit 16 and driving the piston in unit 13 forward which swings clutch lever 15 to a clutch releasing position. The electric gear shifting mechanism is then actuated to shift the transmission gears of the power plant unit to the desired position. The clutch pedal P on the truck is then released causing the release of pressure on the piston of unit 13; the clutch control lever again returning to a clutch engaged position.

With the booster power plant unit thus engaged in driving relation with trailer wheels 9, the ignition circuit (not shown) of such power plant unit is turned on and the unit begins to function. As the carburetor throttle pedal 24 in the cab of the truck is depressed, not only will the truck carburetor throttle be opened and the engine accelerated, but the booster power plant engine will do likewise; the hydraulic control including units 19 and 21 effecting such acceleration. Of course, the carburetor control for the booster engine will operate or function in synchronized relation to the truck carburetor control whereby the engines may be synchronized in operation as far as necessary.

Not only will the trailer power plant unit be useful to assist when the truck and trailer are ascending grades etc. but it will also be useful when descending grades, the compression of said engine producing an effective auxiliary braking action.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A truck including supporting wheels and a drive means therefor, and a semi-trailer for attachment to the truck, the semi-trailer having wheels supporting the rear end thereof; a motor suspended below the load platform of the trailer, a drive means between the motor and wheels of the trailer and independent of the drive means of the truck, and means for controlling the operation of the motor and the action of the drive means of the trailer in synchronism with the motor and drive means of the truck to which the trailer may be hitched.

FRED A. KELLAR.